(12) United States Patent
Thompson et al.

(10) Patent No.: US 10,610,709 B2
(45) Date of Patent: Apr. 7, 2020

(54) COMMUNICATION DEVICE AND METHOD FOR CONFIGURING THE COMMUNICATION DEVICE

(71) Applicant: Scott Technologies, Inc., Monroe, NC (US)

(72) Inventors: Darin Kyle Thompson, Huntersville, NC (US); Todd Ronald Hunter, Calgary (CA); David Allen Amero, Airdrie (CA); Jeremy Vance Barbee, Oakboro, NC (US); Eric James Bassani, Denver, NC (US); Paul Anthony Gale, Airdrie (CA); Robert Heise, Calgary (CA)

(73) Assignee: Scott Technologies, Inc., Monroe, NC (US)

(*) Notice: Subject to any disclaimer, the term of this patent is extended or adjusted under 35 U.S.C. 154(b) by 0 days.

(21) Appl. No.: 15/769,894

(22) PCT Filed: Oct. 21, 2016

(86) PCT No.: PCT/US2016/058167
§ 371 (c)(1),
(2) Date: Apr. 20, 2018

(87) PCT Pub. No.: WO2017/070499
PCT Pub. Date: Apr. 27, 2017

(65) Prior Publication Data
US 2018/0318613 A1    Nov. 8, 2018

Related U.S. Application Data

(60) Provisional application No. 62/245,401, filed on Oct. 23, 2015.

(51) Int. Cl.
*G08B 1/08* (2006.01)
*A62B 18/08* (2006.01)
*H04B 1/3827* (2015.01)

(52) U.S. Cl.
CPC .............. *A62B 18/08* (2013.01); *H04B 1/385* (2013.01); *H04B 2001/3866* (2013.01)

(58) Field of Classification Search
CPC . A62B 18/08; H04B 1/385; H04B 2001/3866
See application file for complete search history.

(56) References Cited

U.S. PATENT DOCUMENTS

| 5,224,473 A | 7/1993 | Bloomfield | |
|---|---|---|---|
| 6,121,881 A * | 9/2000 | Bieback | A62B 18/08 128/201.19 |

(Continued)

OTHER PUBLICATIONS

International Search report for PCT International Application No. PCT/US2016/058167 dated Feb. 2, 2017, 2 pages.

*Primary Examiner* — Phung Nguyen

(57) ABSTRACT

A respirator device and method for configuring the respirator device are provided. The respirator device includes at least one respirator element and a communications device. The commination device including a memory configured to store at least one setting of the communication device. The communication device including processing circuitry in communication with the memory and the communication device. The processing circuitry is configured to receive at least one audible tone and modify at least one setting of the communication device based on the received at least one audible tone. The communication device configured to operate according to the modified at least one setting.

16 Claims, 13 Drawing Sheets

(56) References Cited

U.S. PATENT DOCUMENTS

| | | | |
|---|---|---|---|
| 7,457,427 B2* | 11/2008 | Birli | H04R 1/08 |
| | | | 381/367 |
| 9,833,644 B2* | 12/2017 | Hansel | A62B 18/08 |
| 2009/0238377 A1* | 9/2009 | Ramakrishnan | G10L 21/028 |
| | | | 381/92 |

* cited by examiner

COMMUNICATION DEVICE AND METHOD FOR CONFIGURING THE COMMUNICATION DEVICE

CROSS REFERENCE TO RELATED APPLICATIONS

This application is a national stage filing under 35 U.S.C. 371 of PCT/US2016/058167, filed Oct. 21, 2016, which claims the benefit of U.S. Provisional Patent Application No. 62/245,401, filed Oct. 23, 2015, the disclosures of which are incorporated by reference in their entirety herein.

TECHNICAL FIELD

The present invention relates to communication devices, and in particular to a method and respirator mask for configuring settings of a communication device.

BACKGROUND

Communication devices are used for interpersonal communication by a wide variety of users and in a wide variety of different situations and environments. For example, communication devices may be used by firefighters, HAZMAT workers, medical personnel first responders, and/or other emergency responders at the scene of a fire, natural disaster, and/or other hazardous environment. Other examples of personnel that may utilize communication devices include law enforcement personnel, divers, pilots, drivers, vehicle passengers, presenters, hosts, interviewees, television guests, dispatchers, and/or any users that are remote from each other and/or are separated by smoke, fire, water, fog, another natural condition, a building, a wall, a natural formation, and/or another structure.

Communication devices may include components such as microphones, speakers, amplifiers, radios, and/or the like for providing two-way communication between users (e.g., transmitting speech between different communication devices) and/or for providing one-way communication (e.g., amplifying a user's voice, transmitting and/or broadcasting the user's voice to another location, and/or the like). For example, firefighters may wear mask-mounted amplifiers that transmit the user's voice from inside a mask worn by the firefighter to the environment. Firefighters, divers, HAZMAT workers, and/or the like may carry a communication device that includes a microphone and a speaker that are mounted within a mask worn by the user, for example. Moreover, and for example, hosts, presenters, interviewees, television guests, and/or the like may wear lapel microphones that are worn on the user's lapel, while firefighters, law enforcement, medical personnel, and/or the like may wear remote speaker microphones that include radios for two-way communication with other users. Pilots, drivers, hosts, presenters, law enforcement personnel, medical personal, and/or the like may wear headsets that include microphones and speakers, for example.

As communication devices are used by a variety of different users in a variety of different situations and environments, the default (e.g., standard) configuration of these communication device may not suitable, i.e., ideal, for a given user, a given situation and/or environment. For example, default settings of the communication device may not cover every application, situation, and/or environment encountered by users of the communication device. Accordingly, specialized personnel is often required to manually configure (i.e., setup) the communication device for a given user, situation, and/or environment before the communication device is taken to the hazardous environment or at the hazardous environment, both of which are time consuming and costly processes.

SUMMARY

The present invention relates to communication devices, and in particular advantageously provides a method and respirator mask for configuring settings of a communication device.

According to one embodiment of the invention, a respirator device is provided. The respirator device includes at least one respirator element and a communications device. The commination device including a memory configured to store at least one setting of the communication device. The communication device including processing circuitry in communication with the memory and the communication device. The processing circuitry is configured to receive at least one audible tone and modify at least one setting of the communication device based on the received at least one audible tone. The communication device configured to operate according to the modified at least one setting.

According to one embodiment of this aspect, the at least one audible tone is a plurality of audible tones, the plurality of audible tones corresponding to at least one setting of the plurality of settings. According to another embodiment of this aspect, the at least one setting includes a command function and a parameter value. According to another embodiment of this aspect, the at least one audible tone is a plurality of audible tones. The modification of the at least one setting of the communication device being based on a reception sequence of at least two of the plurality of audible tones.

According to another embodiment of this aspect, the at least one setting of the communication device includes at least one of a mode, gain setting, volume setting, microphone sensitivity, battery type, programming mode setting and power control. According to another embodiment of this aspect, the communication device is a wireless communication device configured to receive at least one wireless communication signal. The at least one wireless communication signal includes the plurality of audible tones. According to another embodiment of this aspect, the at least one audible tone is a plurality of audible tones and the at least one setting of the communication device is a plurality of settings. A first group of the received plurality of audible tones corresponds to a first mode setting, the first mode setting configured to allow at least one of the remaining plurality of settings to be modified using a second group of the received plurality of audible tones less than the first group of received plurality of audible tones.

According to another embodiment of this aspect, the at least one audible tone is a plurality of audible tones. The plurality of audible tones includes at least one command tone and at least one parameter tone. The at least one command tone configured to indicate at least one setting of a command device function to be modified. The at least one parameter tone configured to indicate at least one value of the at least one setting of a command device function to be modified. According to another embodiment of this aspect, the at least one setting of the communication device is a plurality of settings. The received at least one audible tone is configured to modify the plurality of setting of the communication device based on the received at least one audible tone. According to another embodiment of this aspect, the communication device includes a speaker. The processing circuitry is configured to cause the speaker to emit audible feedback in response to the modifying of the at least one setting of the communication device.

According to another embodiment of the invention, a method of configuring a respirator device is provided. The respirator device includes at least one respirator element and a communication device. At least one audible tone is received. At least one setting of the communication device is modified based on the received at least one audible tone. The communication device is configured to operate according to the modified at least one setting.

According to one embodiment of this aspect, the at least one audible tone is a plurality of audible tones. The plurality of audible tones corresponds to at least one setting of the plurality of settings. According to another embodiment of this aspect, the at least one setting includes a command function and a parameter value. According to another embodiment of this aspect, the at least one audible tone is a plurality of audible tones. The modification of the at least one setting of the communication device is based on a reception sequence of at least two of the plurality of audible tones.

According to another embodiment of this aspect, the at least one setting of the communication device includes at least one of a mode, gain setting, volume setting, microphone sensitivity, battery type, programming mode setting and power control. According to another embodiment of this aspect, the communication device is a wireless communication device configured to receive at least one wireless communication signal. The at least one wireless communication signal includes the plurality of audible tones. According to another embodiment of this aspect, the at least one audible tone is a plurality of audible tones and the at least one setting of the communication device is a plurality of settings. A first group of the received plurality of audible tones corresponds to a first mode setting. The first mode setting configured to allow at least one of the remaining plurality of settings to be modified using a second group of the received plurality of audible tones less than the first group of received plurality of audible tones.

According to another embodiment of this aspect, the at least one audible tone is a plurality of audible tones. The plurality of audible tones includes at least one command tone and at least one parameter tone. The at least one command tone configured to indicate at least one setting of a command device function to be modified. The at least one parameter tone configured to indicate at least one value of the at least one setting of a command device function to be modified. According to another embodiment of this aspect, the at least one setting of the communication device is a plurality of settings. The received at least one audible tone is configured to modify the plurality of setting of the communication device based on the received at least one audible tone. According to another embodiment of this aspect, the respirator mask includes a speaker. The speaker is caused to emit audible feedback in response to the modifying of the at least one setting of the communication device.

According to another embodiment of the invention, a respirator device includes at least one respirator element, a wireless communication element configured to receive a plurality of audible tones, and a communications device in communication with the wireless communication element. The communication device includes a memory. The memory configured to store at least one setting of the communication device. The communication device includes processing circuitry in communication with the memory and the communication device. The processing circuitry is configured to receive the plurality of audible tones. The plurality of audible tones includes at least a first sequence of tones. The first sequence of tones includes synchronization sequence of tones, at least one command tone, and at least one parameter tone. The processing circuitry is further configured to modify at least one setting of the communication device based on the received at least one audible tone. The at least one setting of the communication device includes one of a mode, gain setting, volume setting, microphone sensitivity, battery type, programming mode setting and power control. The communication device is configured to operate according to the modified at least one setting of the communication device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the disclosure, it is noted that the embodiments reside primarily in combinations of device components and processing steps related to audible-configuration of a wearable device such as a respirator mask. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
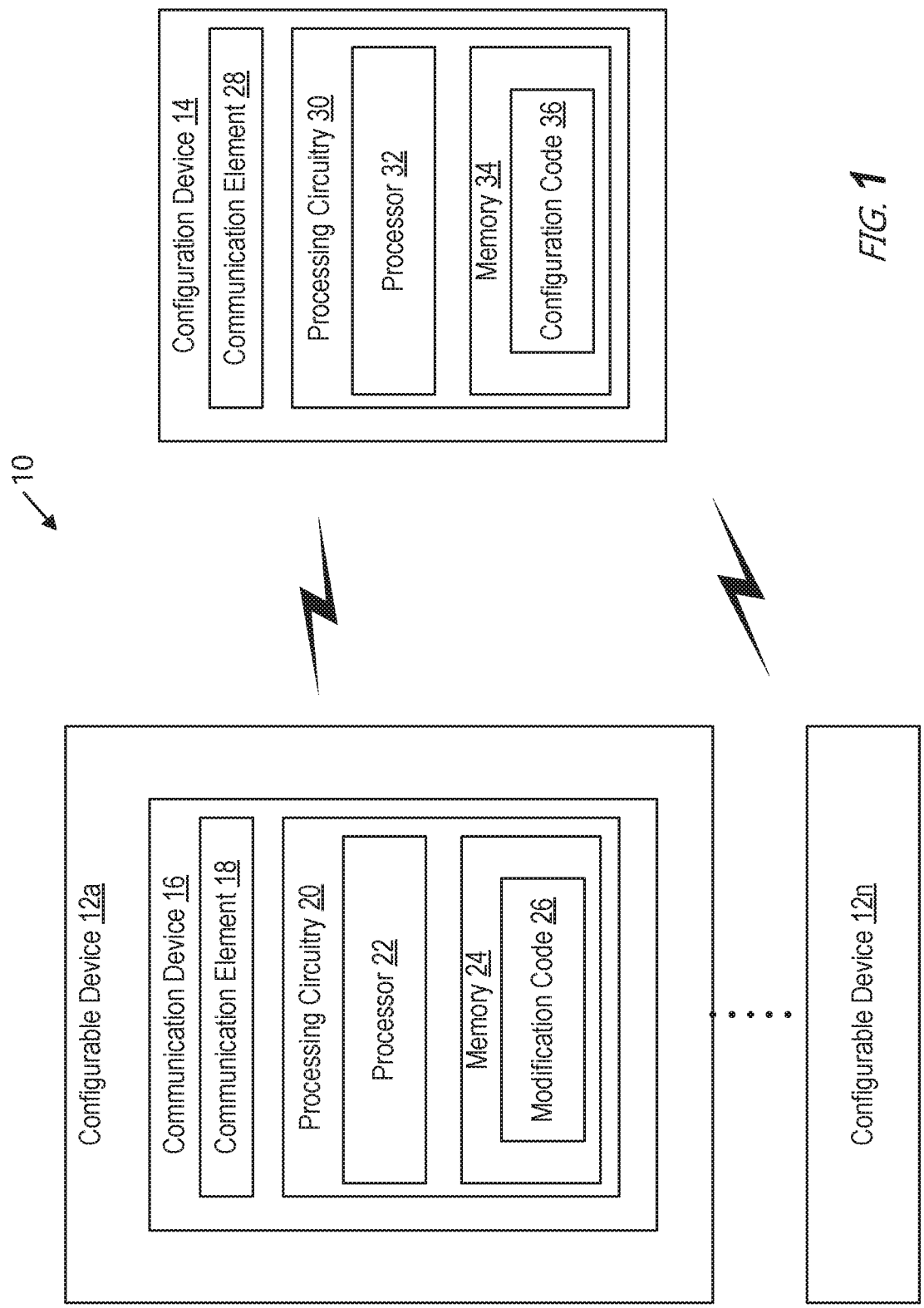
FIG. 1 is a block diagram of an exemplary system for performing audible-configuration of a wearable device such as a respirator mask in accordance with the principles of the invention.

Referring now to drawing figures in which like reference designators refer to like elements there is shown in FIG. 1 an exemplary system for performing audible-configuration of a wearable device such as a respirator mask in accordance with the principles of the disclosure and designated generally as "10." System 10 includes one or more configurable devices 12a-12n (collectively referred to as configurable device 12) and one or more management devices 14 in communication with each other via one-way or two-way communication via one or more communications links, paths and/or networks.

In one or more embodiments, configurable device 12 is a mask such as a respiratory mask having at least one respirator element for use by a firefighter at the scene of a fire, natural disaster, and/or other hazardous environment. The respirator element may be an air filter, oxygen system and/or other element of a respirator that is well known in the art. The respiratory mask includes an embodiment of a communication device 16. The respiratory mask is meant as exemplary only. The communication device 16 may be used with any other type of mask. Moreover, in some other embodiments, communication device 16 is not used with a respirator mask. Communication device 16 includes one or more communication elements and/or communication circuitry (collectively referred to as communication element 18). In one or more embodiments, communication element 18 includes a wireless or wired communication device or circuitry for receiving at least one wireless or wired communication signal including a plurality of audible tones. In one or more embodiments, communication element 18 transmits and amplifies a user's voice from inside configurable device 12 to the environment. For example, in one or more embodiments, the communication device 16 includes a microphone that is mounted inside configurable device 12, e.g., respiratory mask, and a speaker on the exterior of configurable device 12. But, communication device 16 may be any other type of communication device, such as, but not limited to, a communication device that transmits speech between different communication devices (i.e., between itself and other communication devices), a communication device that transmits the user's voice to a remote location, and/or the like. In one or more embodiments, communication device 16 is used with a remote speaker microphone radio that is carried by the user for providing two-way communication others carrying a remote speaker microphone radio. In one or more embodiments, communication device 16 includes one or more radios and/or communicator circuitry for providing two-way communication.

In one or more embodiments communication device 16 is mounted to configurable device 12. In one or more embodiments, communication device 16 includes any other type of communication device and/or component, such as, but not limited to, a headset, a hand held radio, a lapel microphone worn on the user's lapel, a remote speaker microphone, and/or the like. In one or more embodiments, communication device 16 is a one-way communication device. In one or more embodiments, communication device 16 is a wired or a wireless device. In one or more embodiments, configurable device 12 and/or communication device 16 includes an amplifier for amplifying signals such as voice signals.

Although configurable device 12 and/or communication device 16 is described herein for use by a firefighter at the scene of a fire, natural disaster, and/or other hazardous environment, the configurable device 12 and/or communication device 16 may be used by any other user, such as, but not limited to, HAZMAT workers, medical personnel, other emergency responders, law enforcement personnel, divers, pilots, drivers, vehicle passengers, presenters, hosts, interviewees, television guests, dispatchers, any users that are remote from each other and/or are separated by smoke, fire, water, fog, another natural condition, a building, a wall, a natural formation, and/or another structure, and/or the like. Moreover, configurable device 12 and/or communication device 16 may be used at any other situation and/or environment.

In one embodiment, communication device 16 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or read from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc. Processing circuitry 20 may be configured to control any of the methods and/or processes described herein and/or to cause such methods and/or processes to be performed, e.g., by configurable device 12 and/or communication device 16. Corresponding instructions may be stored in the memory 24, which may be readable and/or readably connected to processor 22.

Processor 22 corresponds to one or more processors for performing configurable device 12 and/or communication device 16 functions described herein. Memory 24 is configured to store data, programmatic software code and/or other information described herein. Memory 24 is configured to store modification code 26. For example, modification code 22 includes instructions that, when executed by processor 22, causes processor 22 to perform the process discussed in detail with respect to FIG. 2. In one or more embodiments, processing circuitry 20 is in communication with memory 24 and communication device 16.

Further, memory 24 is configured to store settings of configurable device 12 and/or communication device 16. Memory 24 stores any settings of configurable device 12 and/or communication device 16, such as, but not limited to, mode settings, gain settings, volume settings, microphone sensitivity, battery type, power control, feature on/off control, or accessory controls. Memory 24 also stores the assignation of different audible tones to different settings of the communication device, wherein each different audible tone corresponds to a position of the corresponding setting. As will be described below with respect to FIG. 2, processor 26 is configured to receive audible tones and change the settings of configurable device 12 and/or communication device 16 based on the audio tones received.

Management device 14 includes one or more communication elements and/or communication circuitry (collectively referred to as communication element 28). In one or more embodiments, communication element 28 includes at least one of a speaker, wireless communication transmitter/receiver, wired communication transmitter/receiver, etc. Management device 14 includes communication device 28. Communication device 28 includes processing circuitry 30. Processing circuitry 30 includes processor 32 and memory 34. In addition to a traditional processor and memory, processing circuitry 30 may comprise integrated circuitry for processing and/or control, e.g., one or more processors and/or processor cores and/or FPGAs (Field Programmable Gate Array) and/or ASICs (Application Specific Integrated Circuitry). Processor 32 may be configured to access (e.g., write to and/or read from) memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by processor 32 and/or other data, e.g., data pertaining to communication, e.g., configuration and/or address data of nodes, etc. Processing circuitry 30 may be configured to control any of the methods and/or processes described herein and/or to cause such methods and/or processes to be performed, e.g., by management device 14. Corresponding instructions may be stored in the memory 34, which may be readable and/or readably connected to processor 32.

Processor 32 corresponds to one or more processors for performing management device 14 functions described herein. Memory 34 is configured to store data, programmatic software code and/or other information described herein. Memory 34 is configured to store configuration code 36. For example, configuration code 36 includes instructions that, when executed by processor 32, causes processor 32 to perform the process discussed in detail with respect to FIG. 7.

In one or more embodiments, management device 14 is configured to manage the configuration of the configurable device 12. Specifically, the management device 14 includes a software application such as program code such as configuration code 36 for managing the configuration of configurable device 12 and/or communication device 16. Further, memory 34 is configured to store the different audible tones that are associated with the various different settings of configurable device 12 and/or communication device 16 as a component of the software application. In one or more embodiments, processor 32 of management device 14 is configured to broadcast the audible tones using the speaker.

In one or more embodiments, management device 14 is any type of computer, such as, but not limited to, a personal computer, a laptop computer, a smartphone, a tablet computer, another type of mobile computer, and/or the like, that is specifically configured to perform management device 14 functions described herein. The software application may be written in any computer language and for any operating system (such as, but not limited to, iOS, WINDOWS, and/or the like.

Figure 2:
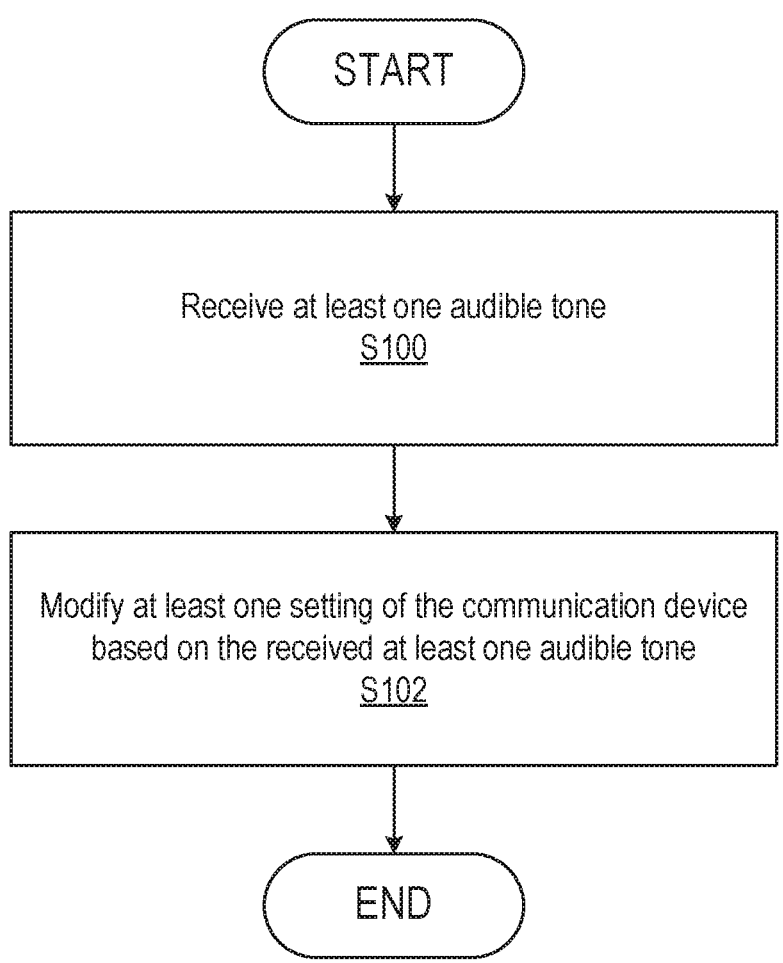
FIG. 2 a flow diagram of an exemplary modification process for modifying one or more settings of configurable device and/or communication device in accordance with the principles of the invention.

FIG. 2 is a flow diagram of an exemplary modification process for modifying one or more settings of configurable device 12 and/or communication device 16 in accordance with the principles of the invention. Processing circuitry 20 is configured to receive at least one audible tone (Block S100). For example, processing circuitry 20 is configured to receive (i.e., hear) the audible tones broadcast by management device 14. In one or more embodiments, processing circuitry 20 is configured to receive the audible tones through communication element 18 such as a microphone of configurable device 12 and/or communication device 16. In one or more embodiments, the audible tones are received at communication element 18 through a wired or wireless communication path.

In one or more embodiments, processing circuitry 20 is configured to monitor (i.e., listen) for the audible tones broadcast from management device 14. In one or more other embodiments, processing circuitry 30 is configured to periodically or continuously listen for a sequence of the audible tones during operation of configurable device 12 and/or communication device 16.

Processing circuitry 20 is configured to modify at least one setting of configurable device 12 and/or communication device 16 based on the received at least one audible tone (Block S102). For example, when processing circuitry 20 receives the sequence of one or more audible tones, processing circuitry 20 changes one or more settings of the configuration of the communication device based on the particular audio tones received from management device 14. Configurable device 12 and/or communication device 16 is configured to operate according to the modified at least one setting.

Specifically, in one or more embodiments, different audible tones are assigned to different settings of configurable device 12 and/or communication device 16, with each different audible tone corresponding to a position of the corresponding setting. When processing circuitry 20 receives a particular audible tone broadcast management device 14, processor 22 accesses memory 24 to determine the corresponding setting with which the received audible tone is associated. In one or more embodiments, the at least one audible tone is a plurality of audible tones and the plurality of audible tones correspond to at least one setting of the plurality of settings. Processor 22 also uses memory 24 to determine the position of the corresponding setting that is associated with the received audible tone. In other words, the particular audible tone received instructs processor 22 as to the particular setting being changed as well as how to change the setting (i.e., which position to set the setting at). Processor 22 then changes the particular setting to the position associated with the particular audible tone received.

For example, in one or more embodiments, memory 24 stores a Table 1 that maps command functions to a command and parameter (i.e., a position or setting of the command function).

When setting an Offset (which can be negative), parameter=Value+32. For example, OPEN_BREATHER_OFFSET value of 0 is indicated by Parameter 32. In other words, in one or more embodiments, the setting of configurable device 12 and/or communication device 16 includes a command function and parameter value.

In one or more embodiments, the command tone frequencies are configured as illustrated in TABLE 2.

TABLE 2

| Frequency Number | Tone Frequency (Hz) |
|---|---|
| F0 | 1080 |
| F1 | 1170 |
| F2 | 1260 |
| F3 | 1350 |
| F4 | 1440 |
| F5 | 1530 |
| F6 | 1620 |
| F7 | 1710 |

In one or more embodiments, the received tones follow a predefined sequence. For example, the predefined sequence can be a long configuration tone sequence that includes eight tone synchronization sequence (Sx), two command tones (Cs) and two parameter tones (Px), thereby creating the following sequence: S0, S1, S2, S3, S4, S5, S6, S7, C0, C1, P0, P1. In one or more embodiments, each tone is 200 msec in duration with 200 msec pause between tones. In one or more embodiments, the synchronization sequence consist of the following tone sequence: S0=F0, S1=F4, S2=F1, S3=F5, S4=F2, S5=F6, S6=F3, S7=F7, where command=8×C0+C1, and parameter=8×P0+P1. Two or more sequences can be transmitted continuously or temporally stacked such that the modification of the at least one setting of configurable device 12 and/or communication device 16 is based on a reception sequence of at least two of the plurality of audible tones. In one or more embodiments, each tone is determined by applying a Fast Fourier Transform (FFT) to the received signal/tone, and detecting a minimum peak energy from the applied FFT. For example, one tone can correspond to a minimum peak energy detected over three periods of 32 ms in the applied FFT, although one or more other criteria for detecting one or more tones may be used.

TABLE 1

| Command Function | Command | Parameter |
|---|---|---|
| CONFIGURATION_SET_RX_POT_MAX_OPEN | 0 | Value |
| CONFIGURATION_SET_RX_POT_CLOSED_AIR_OFFSET | 1 | Offset + 32 |
| CONFIGURATION_AGC_RX_POT_TEST_MODE | 2 | AGC |
| CONFIGURATION_AGC_RX_POT_TEST_MODE_END | 3 | |
| CONFIGURATION_SET_RX_POT_OPEN_AIR_OFFSET | 4 | Offset + 32 |
| CONFIGURATION_SET_RX_POT_OPEN_BREATHER_OFFSET | 5 | Offset + 32 |
| CONFIGURATION_SET_RX_CLOSED_BREATHER_OFFSET | 6 | Offset + 32 |
| CONFIGURATION_RESET_ALL_OFFSETS | 7 | 0 |
| CONFIGURATION_RESET_ALL_OFFSETS_EMEA | 7 | 32 |
| CONFIGURATION_SET_AGC_START | 11 | Value |
| CONFIGURAITON_SET_SPEAKER_FILTER_MODE | 18 | 0-3 |
| CONFIGURATION_SET_BLUETOOTH_TEST_MODE DISCOVERY | 55 | 0 |
| TEST EAR SPEAKER | 55 | 1 |
| CONFIGURATION_SET_BLUETOOTH_MODE FRONT_SPEAKER | 50 | 3 |
| REAR_SPEAKER | 50 | 2 |
| CONFIGURATION_TURN_AMP_OFF | 63 | n/a |

In one or more embodiments, an abbreviated synchronization sequence to speed up configuration is implemented. Once configurable device 12 and/or communication device 16 has received a Test Mode command, a short configuration tone sequence, i.e., a first group of the received plurality of audible tones corresponds to a first mode setting where the first mode setting configured to allow at least one of the remaining plurality of settings to be modified using a second group of the received plurality of audible tones less than the first group of received plurality of audible tones. The short configuration tone sequence consists of two tone synchronization sequence (Sx), two command tones (Cx) and two parameter tones (Px), thereby creating the following sequence: S6, S7, C0, C1, P0, P1. In one or more embodiments, each tone is 200 msec in duration with a 200 msec pause between tones.

In one or more embodiments, the synchronization sequence includes the following tone sequence: S6=F3, S7=F7, where command=8×C0+C1 and parameter=8×P0+P1. For example, to set the AGC_START value to 21, the following would be sent to configurable device 12 and/or communication device 16: Command 11: C0=1+C1=3, Parameter 21: P0=2+P1=5.

In one or more embodiments, memory 24 of configurable device 12 and/or communication device 16 is configured to store a configuration of configurable device 12 and/or communication device 16 that includes positions of a plurality (i.e., a group of some or all of the settings of configurable device 12 and/or communication device 16) of the settings of configurable device 12 and/or communication device 16. In one or more embodiments, a particular audible tone is associated with the configuration stored by memory 24 such that the processor 22, upon reception of the particular audible tone, is configured to change the group of settings of configurable device 12 and/or communication device 16 to the positions of the configuration stored by the memory 24.

Configurable device 12 and/or communication device 16 is audio-configurable. In other words, the settings of configurable device 12 and/or communication device 16 can be configured using a sequence of one or more of the audible tones broadcast by management device 14. Specifically, to configure the settings of configurable device 12 and/or communication device 16, management device 14 broadcasts a sequence of one or more of the audible tones using communication element 28 such as a speaker. In one or more embodiments, processing circuitry 20 is configured to cause the speaker of configurable device 12 and/or communication device 16 to emit audible feedback in response to the modifying of the at least one setting of the communication device. The audible feedback may be a portion of the received audible tones, one or more predefined tone similar to different from the received audible tones, or other variations thereof.

Figure 3:
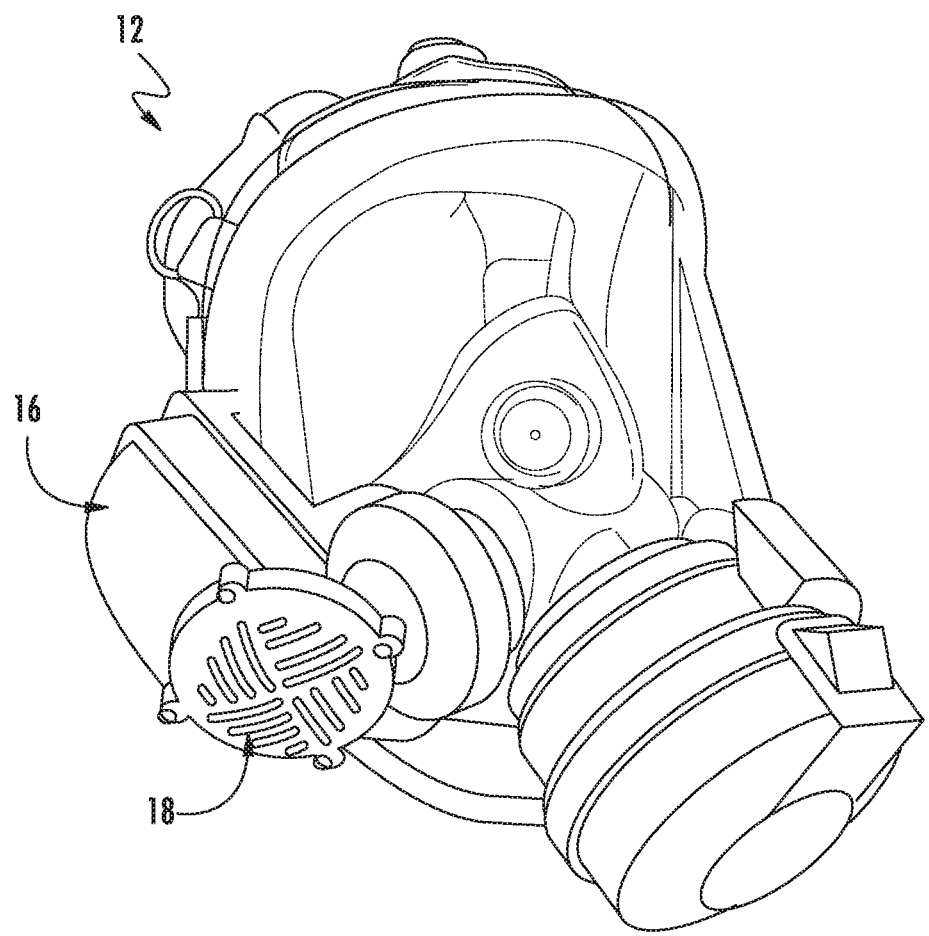
FIG. 3 illustrates an exemplary embodiment of configurable device and communication device in accordance with the principles of the invention.
Figure 6:
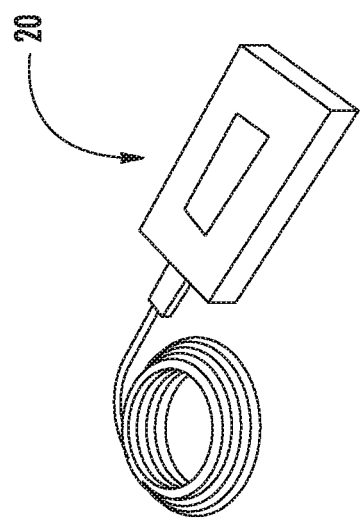
FIG. 6 illustrates an exemplary embodiment of processing circuitry in accordance with the principles of the invention.
Figure 5:
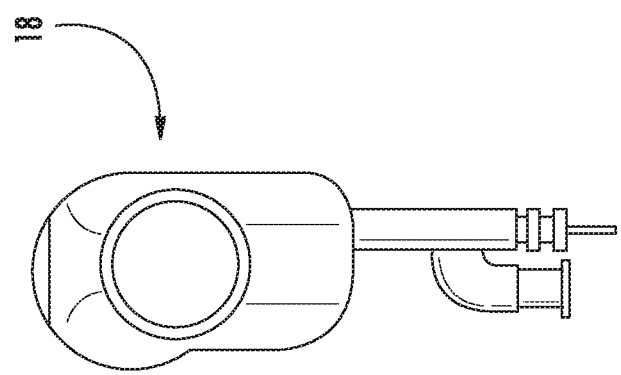
FIG. 5 illustrates an exemplary embodiment of communication element where the communication element is a remote speaker microphone radio in accordance with the principles of the invention.
Figure 4:
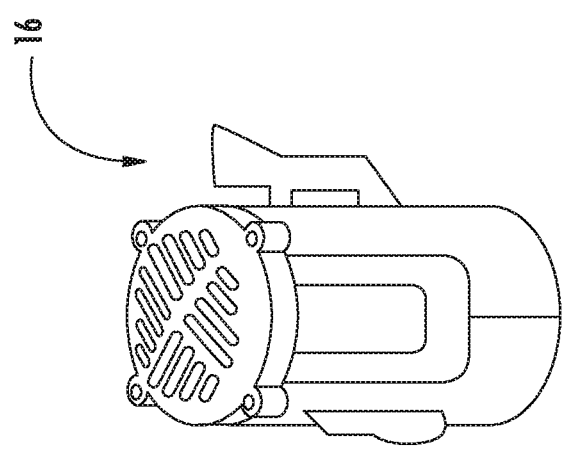
FIG. 4 illustrates an exemplary embodiment of communication device in accordance with the principles of the invention.

FIG. 3 illustrate an exemplary embodiment of configurable device 12 and communication device 16 in accordance with the principles of the invention. In particular, configurable device 12 is a respirator mask including at least one respirator element as is well known in the art. The respirator mask includes communication element 18 such as a speaker and/or microphone as discussed above. FIG. 4 illustrates an exemplary embodiment of communication device 16 in accordance with the principles of the invention. In this embodiment, communication device 16 is removably attachable to configurable device 12. FIG. 5 illustrates an exemplary embodiment of commination element 18 where communication element 18 is a remote speaker microphone radio. FIG. 6 illustrates an exemplary embodiment of processing circuitry 20.

Figure 7:
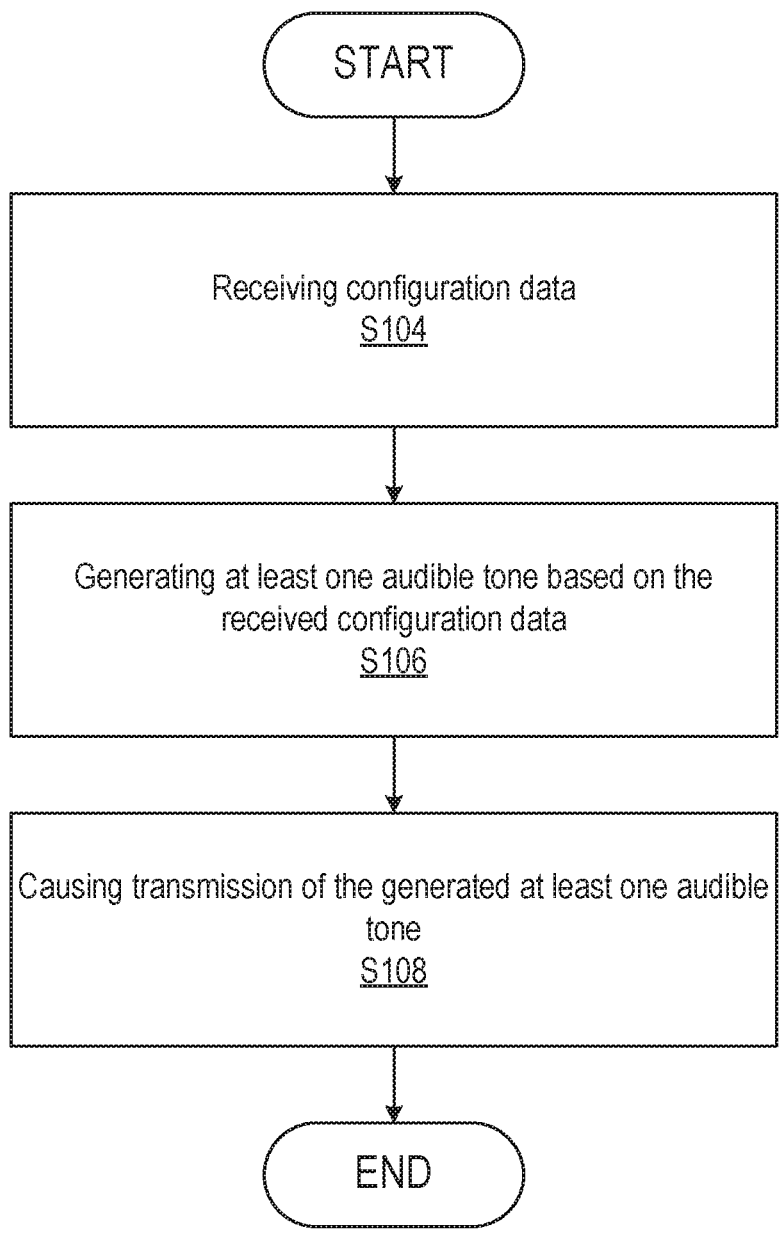
FIG. 7 is a flow chart of an exemplary embodiment of the configuration process of configuration code in accordance with the principles of the invention.

FIG. 7 is a flow chart of an exemplary embodiment of the configuration process of configuration code 36 in accordance with the principles of the invention. Processing circuitry 30 receives configuration data (Block S104). For example, processing circuitry 30 receives configuration data via one or more interfaces such as those illustrated in FIGS. 8-18, discussed below. Processing circuitry 30 generates at least one audible tone based on the received configuration data (Block S106). For example, processing circuitry 30 generates tones by matching commands and parameters from the input configuration data to one or more tones such as a sequence of tones using Tables 1 and 2 discussed above. Processing circuitry 30 is configured to cause transmission of the generated at least one audible tone (Block S108). For example, in one or more embodiments, processing circuitry 30 causes communication element 28 to transmit or emit the generated at least one audible tone corresponding to the input configuration data such that one or more specific settings are modified at configurable device 12 and/or communication device 16.

Figure 8:
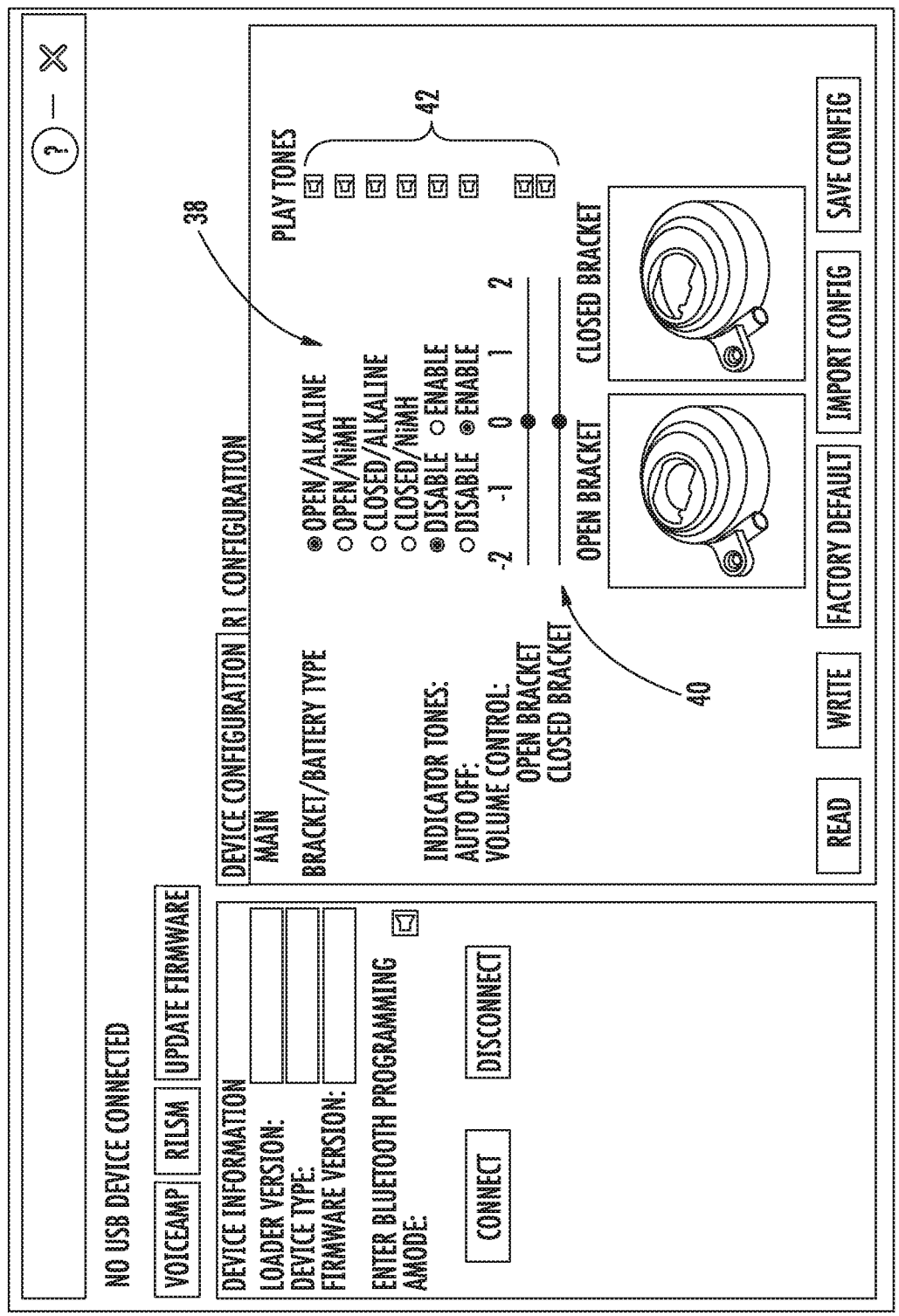
FIG. 8 illustrates an embodiment of an interface for managing various battery type settings and various volume settings in accordance with the principles of the invention.

FIG. 8-11 are screenshots illustrating an embodiment of an interface for managing the configuration of configurable device 12 and/or communication device 16 using an embodiment of configuration code or software application designed to operate on one or more operating systems. In particular, the interface advantageously provides a user friendly environment for modifying or adjusting one or more settings by a few clicks of a computer mouse, e.g., for providing input configuration data, in which the interface, i.e. software application/configuration code 36 operating on management device 14 generates the one or more audible tones based on the input configuration data. Specifically, FIG. 8 illustrates an embodiment of an interface for managing various battery type settings 38 and various volume settings 40. As shown in FIG. 8, tone buttons 42 corresponding to the various settings 38 and 40 can be actuated to broadcast the audible tone associated with the corresponding setting and/or setting position. As used herein, RILSM refers to Radio Interface Lapel Speaker Microphone. In one or more embodiments, RILSM can be a BLUETOOTH (BT) lapel speaker microphone (BTLSM) and/or other wireless protocol based lapel speaker microphone(s).

Figure 9:
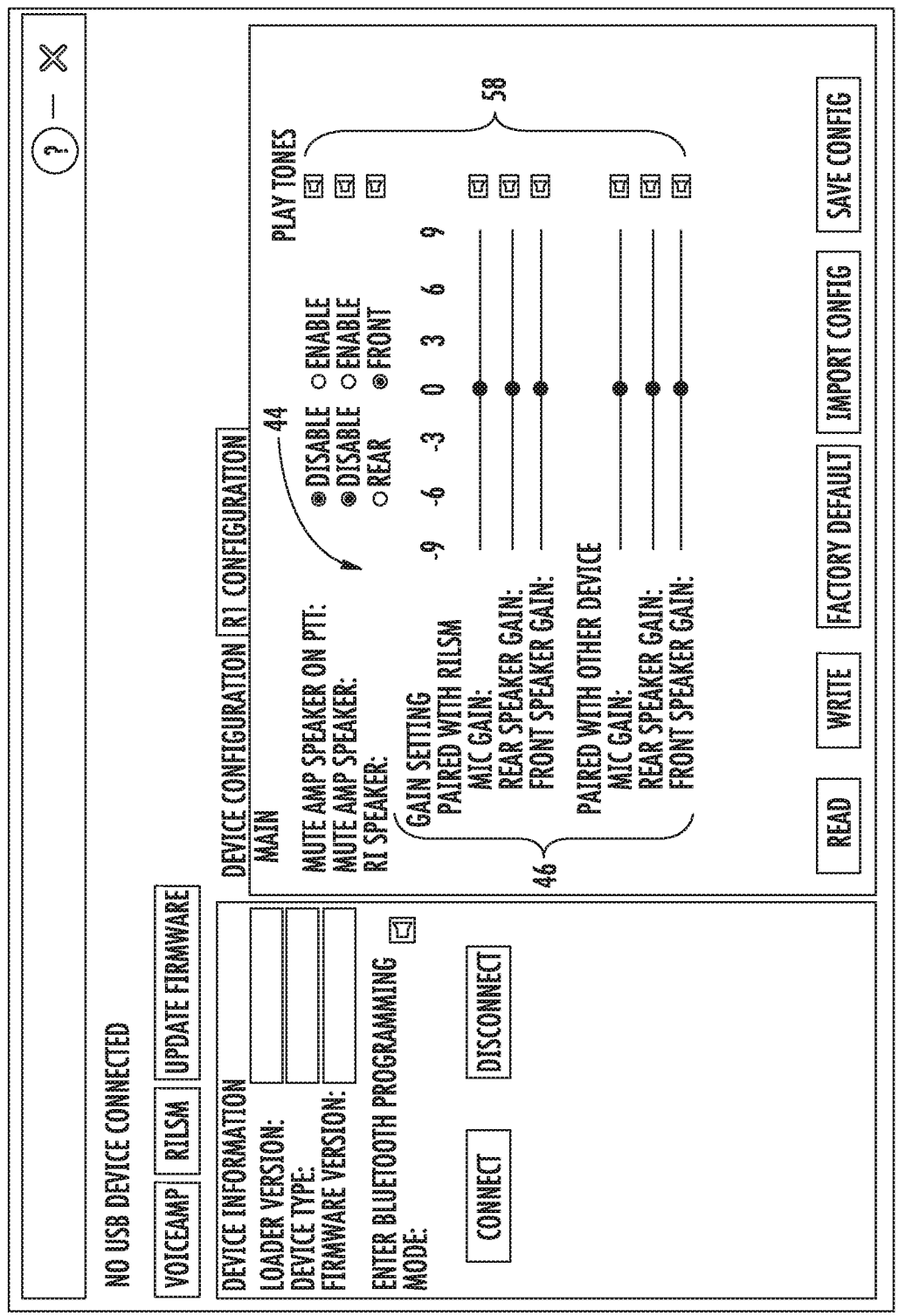
FIG. 9 illustrates an embodiment of the interface for managing various amplifier settings and various gain settings in accordance with the principles of the invention.
Figure 10:
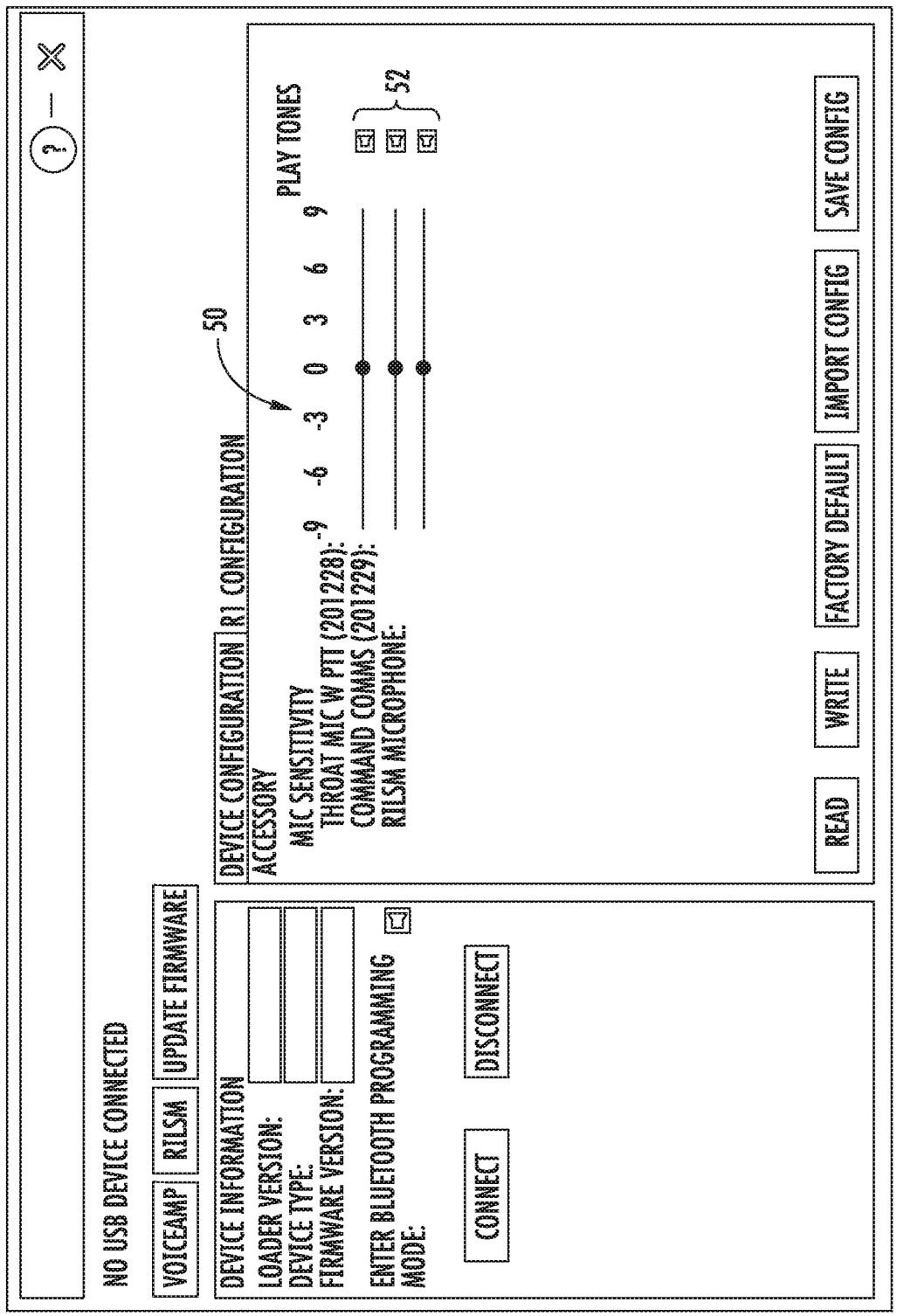
FIG. 10 illustrates an embodiment of the for managing various microphone sensitivity settings in accordance with the principles of the invention.
Figure 11:
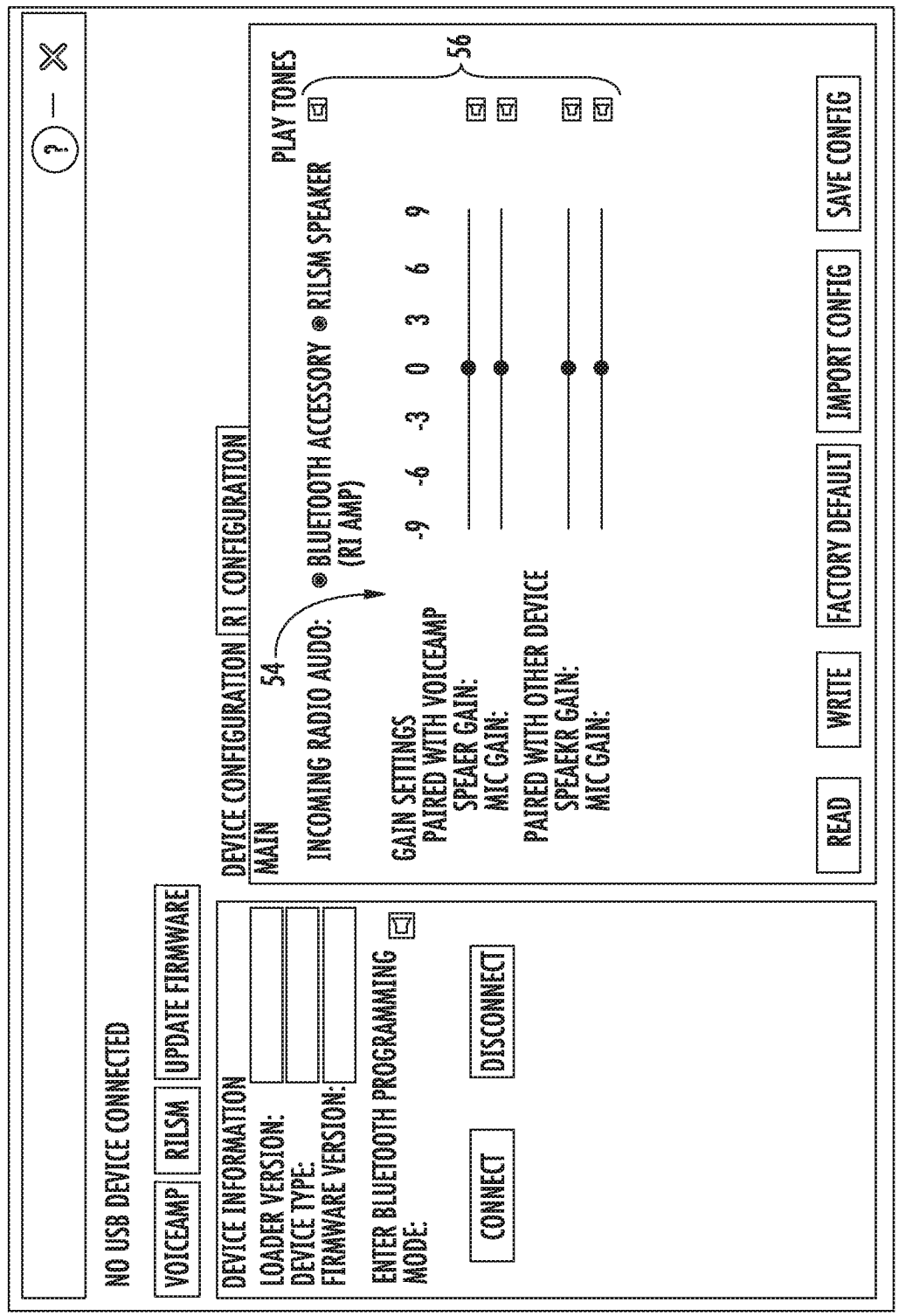
FIG. 11 illustrates an embodiment of the interface for managing various gain settings in accordance with the principles of the invention.

FIG. 9 illustrates an embodiment of the interface for managing various amplifier settings 44 and various gain settings 46. The interface illustrated in FIG. 9 also includes tone buttons 48 that correspond to the various settings 44 and 46 for broadcasting the audible tone associated with the corresponding setting and/or setting position. FIG. 10 illustrates an embodiment for managing various microphone sensitivity settings 50. Tone buttons 52 that correspond to the various settings 50 are included in the interface for broadcasting the audible tone associated with the corresponding setting and/or setting position. FIG. 11 illustrates an embodiment of the interface for managing various gain settings 54. As shown in FIG. 11, tone buttons 56 corresponding to the various settings 54 can be actuated to broadcast the audible tone associated with the corresponding setting and/or setting position.

Figure 13:
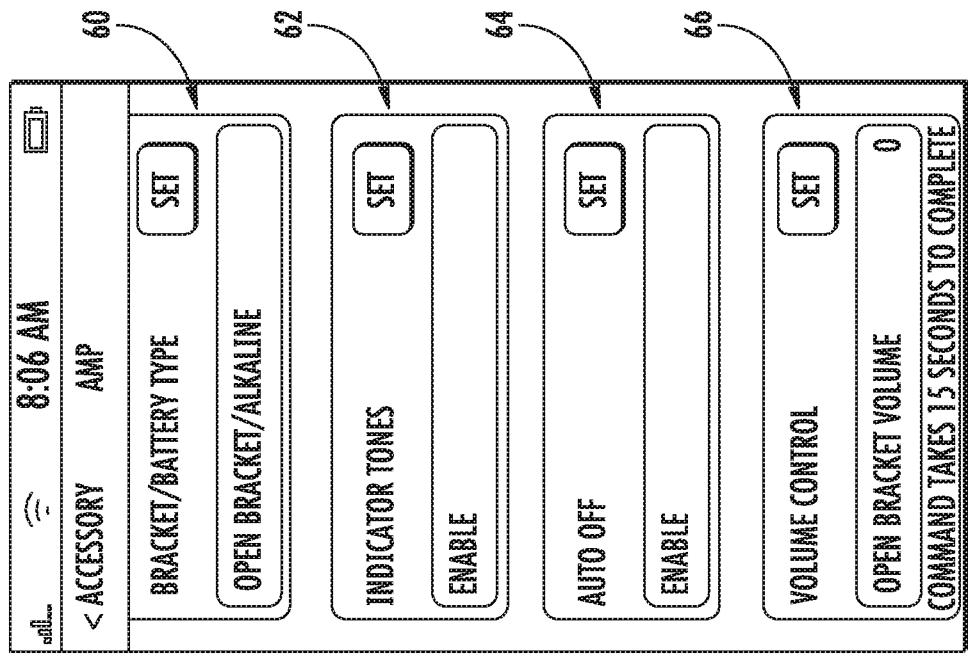
FIG. 13 illustrates an embodiment of an interface for configuring battery type settings, indicator tone settings, an auto OFF setting, and a volume setting of an amplifier of the communication device in accordance with the principles of the invention.
Figure 12:
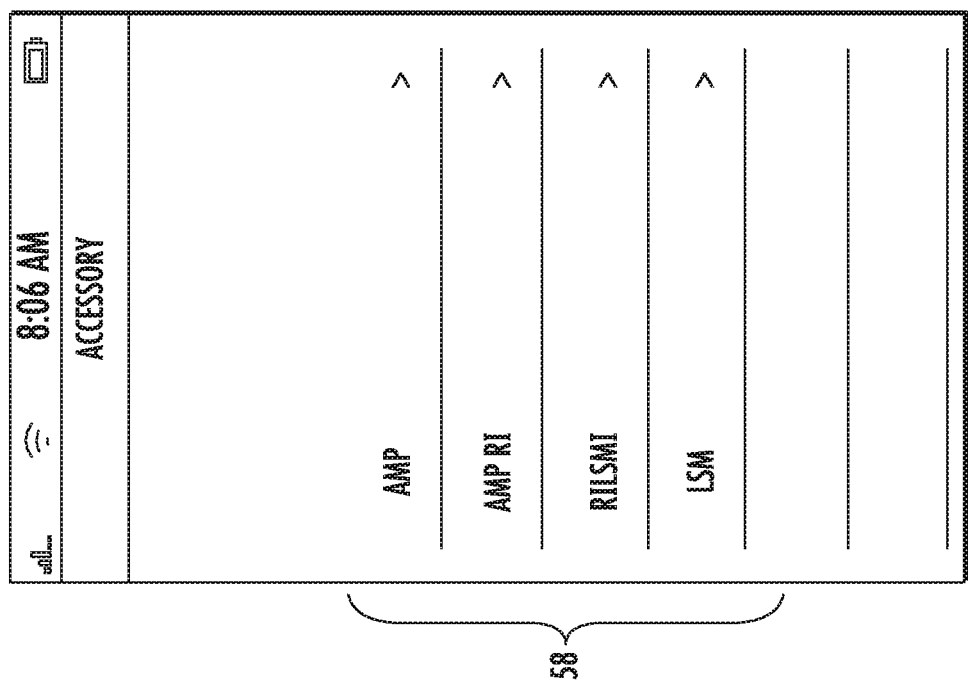
FIG. 12 illustrates an embodiment of a home screen interface for selecting the component or feature of the communication device to be configured in accordance with the principles of the invention.
Figure 15:
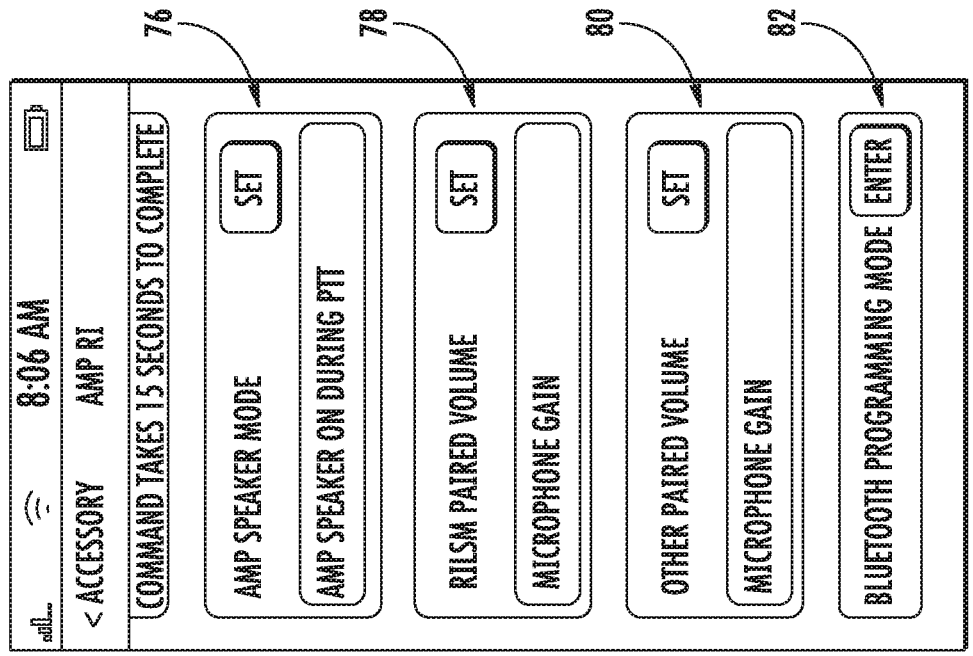
FIG. 15 illustrates an embodiment of an interface for configuring an amp speaker mode setting, a volume setting, another volume setting, and a programming mode setting of the other amplifier of the communication device in accordance with the principles of the invention.
Figure 14:
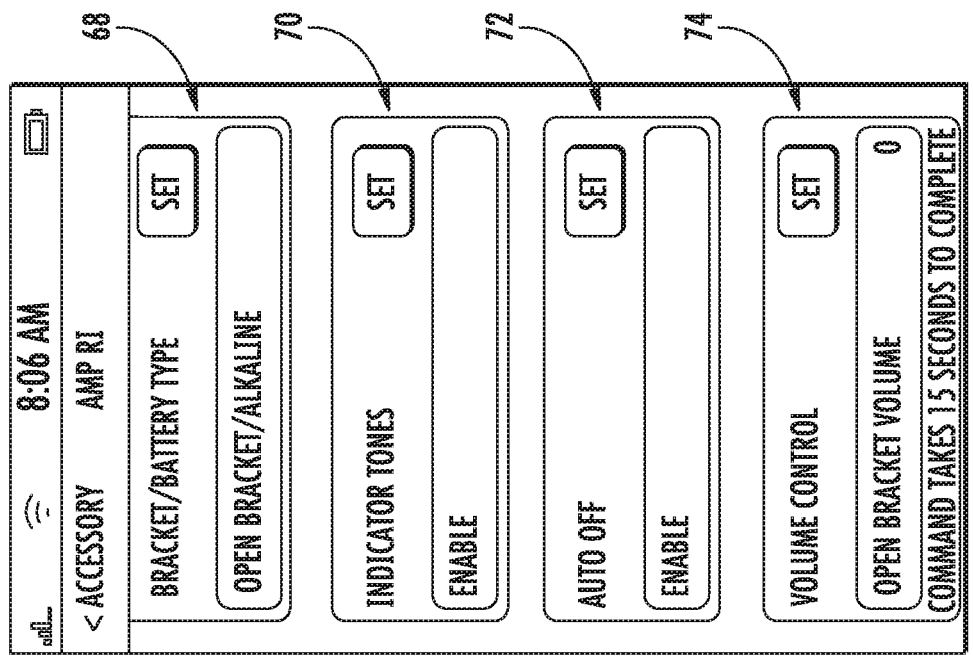
FIG. 14 illustrates an embodiment of an interface for configuring battery type settings, indicator tone settings, an auto OFF setting, and a volume setting of another amplifier of the communication device in accordance with the principles of the invention.

FIGS. 12-18 are screenshots illustrating an embodiment of the interface for managing the configuration of configurable device 12 and/or communication device 16. Specifically, FIG. 12 illustrates an embodiment of a home screen interface for selecting the component or feature 60 of the communication device 30 to be configured. FIG. 13 illustrates an embodiment of an interface for configuring battery type settings 62, indicator tone settings 64, an auto OFF setting 66, and a volume setting 68 of an amplifier of the communication device 12. FIG. 14 illustrates an embodiment of an interface for configuring battery type settings 72, indicator tone settings 74, an auto OFF setting 76, and a volume setting 78 of another amplifier of the communication device 12. FIG. 15 illustrates an embodiment of an interface for configuring an Amp speaker mode setting 80, a volume setting 82, another volume setting 84, and a programming mode setting 86 of the other amplifier of the communication device 12.

Figure 17:
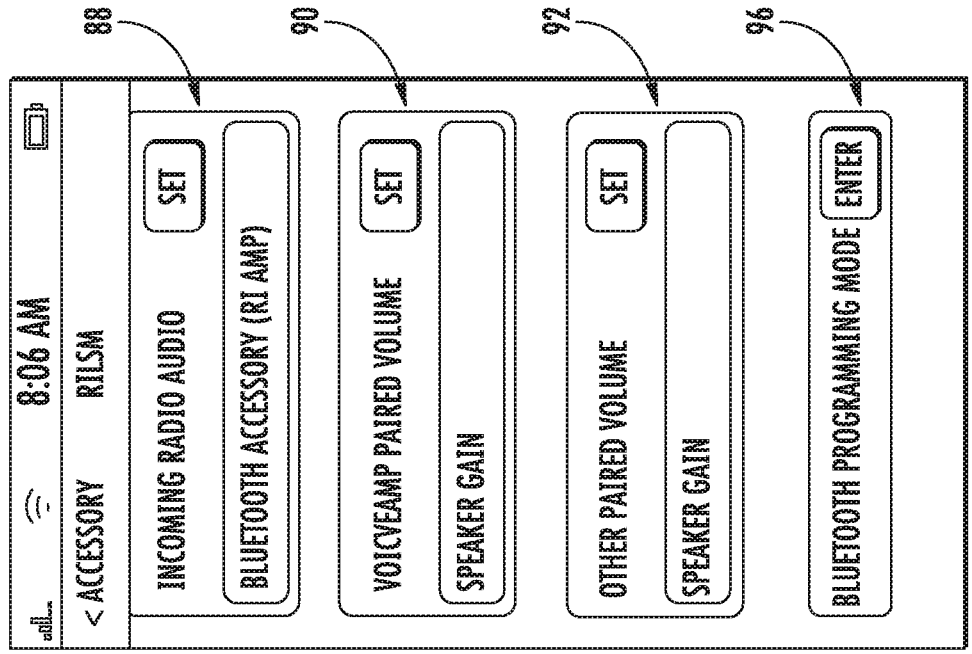
FIG. 17 illustrates an embodiment of an interface for configuring the incoming radio audio setting, the volume setting, another volume setting, and a programming mode setting of configurable device and/or communication device in accordance with the principles of the invention.
Figure 16:
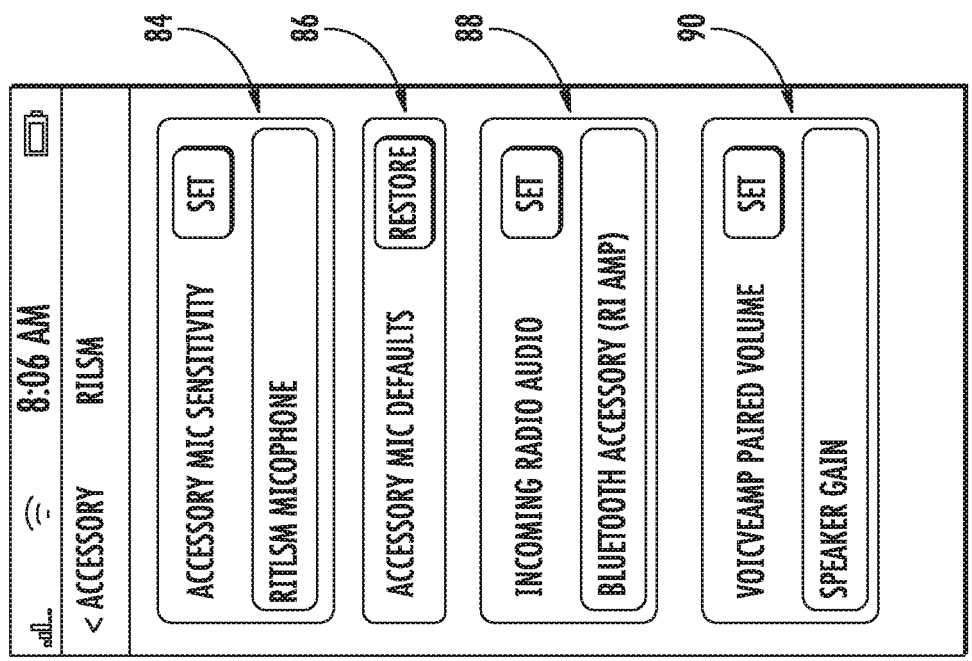
FIG. 16 illustrates an embodiment of an interface for configuring a microphone sensitivity setting, a microphone default setting, an incoming radio audio setting, and a volume setting in accordance with the principles of the invention.
Figure 18:
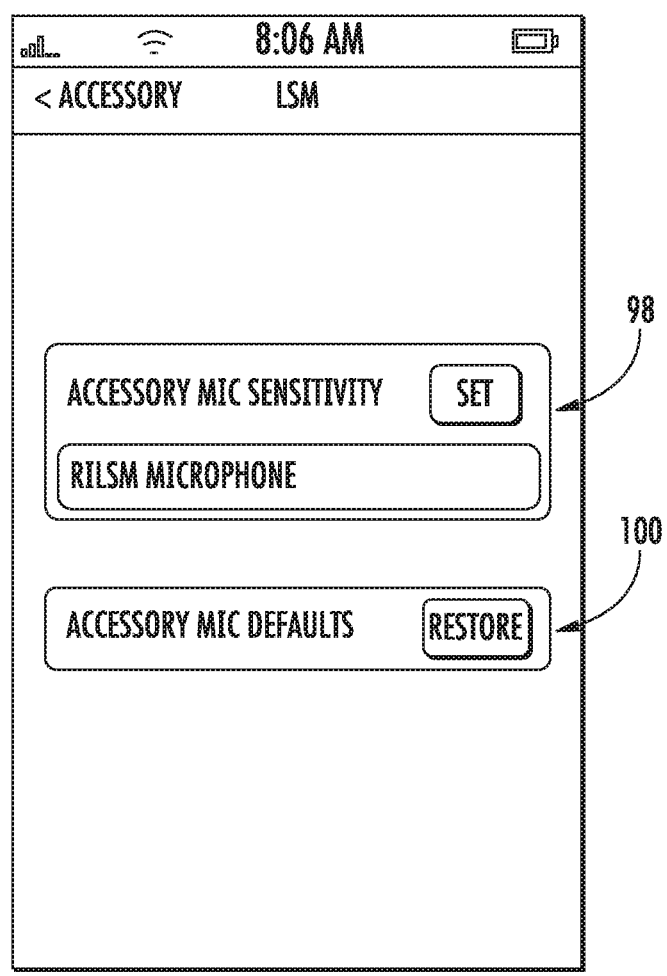
FIG. 18 illustrates an embodiment of an interface for configuring a microphone sensitivity setting and a microphone default setting of a configurable device and/or communication device in accordance with the principles of the invention.

FIG. 16 illustrates an embodiment of an interface for configuring a microphone sensitivity setting 84, a microphone default setting 86, an incoming radio audio setting 88, and a volume setting 90 of the RILSM of configurable device 12 and/or communication element 16. FIG. 17 illustrates an embodiment of an interface for configuring the incoming radio audio setting 88, the volume setting 90, another volume setting 92, and a programming mode setting 96 of the RILSM of configurable device 12 and/or communication device 16. FIG. 18 illustrates an embodiment of an interface for configuring a microphone sensitivity setting 98 and a microphone default setting 100 of a Lapel Speaker Microphone (LSM) of configurable device 12 and/or communication device 16.

In one embodiment, respirator device 12 includes: at least one respirator element and a communications device 16. Communication device 16 including a memory 24, the memory 24 configured to store at least one setting of the communication device 16. The communication device 16 includes processing circuitry 20 in communication with the memory 24 and the communication device 16. The processing circuitry 20 configured to: receive at least one audible tone and modify at least one setting of the communication device 16 based on the received at least one audible tone. The communication device 16 configured to operate according to the modified at least one setting.

In one embodiment of this aspect, the at least one audible tone is a plurality of audible tones. The plurality of audible tones correspond to at least one setting of the plurality of settings.

In one embodiment of this aspect, the at least one setting includes a command function and a parameter value.

In one embodiment of this aspect, the at least one audible tone is a plurality of audible tones. The modification of the at least one setting of the communication device 16 is based on a reception sequence of at least two of the plurality of audible tones.

In one embodiment of this aspect, the at least one setting of the communication device 16 includes at least one of a mode, gain setting, volume setting, microphone sensitivity, battery type, programming mode setting and power control.

In one embodiment of this aspect, the communication device 16 is a wireless communication device 16 configured to receive at least one wireless communication signal. The at least one wireless communication signal includes the plurality of audible tones.

In one embodiment of this aspect, the at least one audible tone is a plurality of audible tones and the at least one setting of the communication device 16 is a plurality of settings. A first group of the received plurality of audible tones corresponds to a first mode setting, the first mode setting configured to allow at least one of the remaining plurality of settings to be modified using a second group of the received plurality of audible tones less than the first group of received plurality of audible tones.

In one embodiment of this aspect, the at least one audible tone is a plurality of audible tones. The plurality of audible tones includes at least one command tone and at least one parameter tone. The at least one command tone configured to indicate at least one setting of a command device function to be modified. The at least one parameter tone configured to indicate at least one value of the at least one setting of a command device function to be modified.

In one embodiment of this aspect, the at least one setting of the communication device 16 is a plurality of settings. The received at least one audible tone is configured to modify the plurality of setting of the communication device 16 based on the received at least one audible tone.

In one embodiment of this aspect, the communication device 16 includes a speaker. The processing circuitry 20 is configured to cause the speaker to emit audible feedback in response to the modifying of the at least one setting of the communication device 16.

In another embodiment, a method of configuring a respirator device is provided. The respirator device includes at least one respirator element and a communication device. The method includes receiving at least one audible tone (Block S100), and modifying at least one setting of the communication device based on the received at least one audible tone (Block S102). The communication device configured to operate according to the modified at least one setting.

In one embodiment of this aspect, the at least one audible tone is a plurality of audible tones. The plurality of audible tones corresponds to at least one setting of the plurality of settings.

In one embodiment of this aspect, the at least one setting includes a command function and a parameter value.

In one embodiment of this aspect, the at least one audible tone is a plurality of audible tones. The modification of the at least one setting of the communication device is based on a reception sequence of at least two of the plurality of audible tones.

In one embodiment of this aspect, the at least one setting of the communication device includes at least one of a mode, gain setting, volume setting, microphone sensitivity, battery type, programming mode setting and power control.

In one embodiment of this aspect, the communication device is a wireless communication device configured to receive at least one wireless communication signal. The at least one wireless communication signal includes the plurality of audible tones.

In one embodiment of this aspect, the at least one audible tone is a plurality of audible tones and the at least one setting of the communication device is a plurality of settings. A first group of the received plurality of audible tones corresponding to a first mode setting. The first mode setting is configured to allow at least one of the remaining plurality of settings to be modified using a second group of the received plurality of audible tones less than the first group of received plurality of audible tones.

In one embodiment of this aspect, the at least one audible tone is a plurality of audible tones. The plurality of audible tones includes at least one command tone and at least one parameter tone. The at least one command tone configured to indicate at least one setting of a command device function to be modified. The at least one parameter tone configured to indicate at least one value of the at least one setting of a command device function to be modified.

In one embodiment of this aspect, the at least one setting of the communication device is a plurality of settings. The received at least one audible tone is configured to modify the plurality of setting of the communication device based on the received at least one audible tone.

In one embodiment of this aspect, the respirator mask includes a speaker. The method further includes causing the speaker to emit audible feedback in response to the modifying of the at least one setting of the communication device.

According to another embodiment, a respirator device includes at least one respirator element, a wireless communication element 18 configured to receive a plurality of audible tones, and a communications device 16 in communication with the wireless communication element 18. The communication device 16 includes a memory 24. The memory 24 configured to store at least one setting of the communication device 16. The communication device 16 includes processing circuitry 20 in communication with the memory 24 and the communication device 16. The processing circuitry 20 is configured to receive the plurality of audible tones. The plurality of audible tones includes at least a first sequence of tones. The first sequence of tones includes synchronization sequence of tones, at least one command tone, and at least one parameter tone. The processing circuitry 20 is further configured to modify at least one setting of the communication device 16 based on the received at least one audible tone. The at least one setting of the communication device 16 includes one of a mode, gain setting, volume setting, microphone sensitivity, battery type, programming mode setting and power control. The communication device 16 is configured to operate according to the modified at least one setting of the communication device 16.

Other embodiments include:

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Other embodiments may include:

Embodiment 1. A communication device comprising:
at least one of a speaker or a microphone;
a memory configured to store settings of the communication device; and a processor configured to monitor for audible tones and change the settings of the communication device based on the audio tones received thereby.

Embodiment 2. The communication device of Embodiment 1, wherein different audible tones are assigned to different settings of the communication device, each different audible tone corresponding to a position of the corresponding setting.

Embodiment 3. The communication device of Embodiment 1, wherein the settings of the communication device include first and second settings and the audible tones include first and second audible tones, wherein upon reception of the first audible tone the processor is configured to change the first setting to a position associated with the first audible tone, and wherein upon reception of the second audible tone the processor is configured to change the second setting to a position associated with the second audible tone.

Embodiment 4. The communication device of Embodiment 1, wherein the memory is configured to store a configuration of the communication device that includes positions of a plurality of the settings of the device, a first audible tone of the audible tones being associated with the configuration stored by the memory such that the processor is configured to change the plurality of settings of the communication device to the positions of the configuration stored by the memory upon reception of the first audible tone.

Embodiment 5. The communication device of Embodiment 1, wherein the settings comprise at least one of mode settings, gain settings, volume settings, microphone sensitivity, battery type, feature on/off control, or accessory controls.

Embodiment 6. The communication device of Embodiment 1, wherein the processor is configured to receive the audible tones through the at least one of a speaker or a microphone.

Embodiment 7. A method for changing the configuration of a communication device, the method comprising:

broadcasting audible tones from a computer using a software application of the computer that is configured to manage the configuration of the communication device; and receiving the audible tones at the communication device; and changing one or more settings of the configuration of the communication device based on the audio tones received from the application.

Embodiment 8. The method of Embodiment 7, wherein different audible tones are assigned to different settings of the communication device, each different audible tone corresponding to a position of the corresponding setting.

Embodiment 9. The method of Embodiment 7, wherein the settings of the communication device include first and second settings and the audible tones include first and second audible tones, wherein changing one or more settings of the configuration of the communication device based on the audio tones received from the application comprises changing the first setting to a position associated with the first audible tone and changing the second setting to a position associated with the second audible tone.

Embodiment 10. The method of Embodiment 7, wherein the settings comprise at least one of mode settings, gain settings, volume settings, microphone sensitivity, battery type, feature on/off control, or accessory controls.

Embodiment 11. The method of Embodiment 7, wherein receiving the audible tones at the communication device comprises receiving the audible tones through at least one of a speaker or a microphone of the communication device.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A respirator device, comprising:
at least one respirator element;
a communications device including:
    a memory, the memory configured to store at least one setting of the communication device;
    processing circuitry in communication with the memory and the communication device, the processing circuitry configured to:
        receive a plurality of audible tones, a first group of the received plurality of audible tones corresponding to a first mode setting, the first mode setting configured to allow at least one of a remaining plurality of settings to be modified using a second group of the received plurality of audible tones less than the first group of received plurality of audible tones;
        modify the at least one setting of the communication device based on the received plurality of audible tones; and
    the communication device configured to operate according to the modified at least one setting.

2. The respirator device of claim 1, wherein the at least one setting further comprises a command function and a parameter value.

3. The respirator device of claim 1, wherein
the modification of the at least one setting of the communication device is based on a reception sequence of at least two of the plurality of audible tones.

4. The respirator device of claim 1, wherein the at least one setting of the communication device further includes at least one of a mode, gain setting, volume setting, microphone sensitivity, battery type, programming mode setting and power control.

5. The respirator device of claim 1, wherein the communication device is a wireless communication device configured to receive at least one wireless communication signal, the at least one wireless communication signal including the plurality of audible tones.

6. The respirator device of claim 1, wherein the plurality of audible tones includes at least one command tone and at least one parameter tone;
the at least one command tone configured to indicate at least one setting of a command device function to be modified; and
the at least one parameter tone configured to indicate at least one value of the at least one setting of a command device function to be modified.

7. The respirator device of claim 1, wherein the received plurality of audible tones are configured to modify the plurality of settings of the communication device based on the received plurality of audible tones.

8. The respirator device of claim 1, wherein the communication device includes a speaker; and
the processing circuitry configured to cause the speaker to emit audible feedback in response to the modifying of the at least one setting of the communication device.

9. A method of configuring a respirator device, the respirator device including at least one respirator element and a communication device, the method comprising:
receiving a plurality of audible tones, a first group of the received plurality of audible tones corresponding to a first mode setting, the first mode setting configured to allow at least one of a remaining plurality of settings to be modified using a second group of the received plurality of audible tones less than the first group of received plurality of audible tones;
modifying at least one setting of the communication device based on the received plurality of audible tones; and the communication device configured to operate according to the modified at least one setting.

10. The method of claim 9, wherein
the modification of the at least one setting of the communication device is based on a reception sequence of at least two of the plurality of audible tones.

11. The method of claims 9, wherein the at least one setting of the communication device further includes at least one of a mode, gain setting, volume setting, microphone sensitivity, battery type, programming mode setting and power control.

12. The method of claim 9, wherein the communication device is a wireless communication device configured to receive at least one wireless communication signal, the at least one wireless communication signal including the plurality of audible tones.

13. The method of claim 9, wherein the plurality of audible tones includes at least one command tone and at least one parameter tone;
the at least one command tone configured to indicate at least one setting of a command device function to be modified; and
the at least one parameter tone configured to indicate at least one value of the at least one setting of a command device function to be modified.

14. The method of claim 9, wherein the received plurality of audible tones are configured to modify the plurality of settings of the communication device based on the received plurality of audible tones.

15. The method of claim 9, wherein the respirator device includes a speaker; and
the method further comprises causing the speaker to emit audible feedback in response to the modifying of the at least one setting of the communication device.

16. A respirator device, comprising:
at least one respirator element;
a wireless communication element configured to receive a plurality of audible tones;
a communications device in communication with the wireless communication element, the communication device including:
 a memory, the memory configured to store at least one setting of the communication device;
 processing circuitry in communication with the memory and the communication device, the processing circuitry configured to:
  receive the plurality of audible tones, the plurality of audible tones including at least a first sequence of tones, the first sequence of tones including:
  synchronization sequence of tones;
  at least one command tone; and
  at least one parameter tone; and
  modify at least one setting of the communication device based on the received plurality of audible tones, the at least one setting of the communication device including one of a mode, gain setting, volume setting, microphone sensitivity, battery type, programming mode setting and power control; and
the communication device configured to operate according to the modified at least one setting of the communication device.

* * * * *